(12) United States Patent
Leflore

(10) Patent No.: US 9,269,277 B2
(45) Date of Patent: Feb. 23, 2016

(54) VOCAL / INSTRUMENTAL TRAINING SYSTEM AND METHOD OF SAME

(71) Applicant: Bradley Wilson Leflore, Morgan City, MS (US)

(72) Inventor: Bradley Wilson Leflore, Morgan City, MS (US)

( * ) Notice: Subject to any disclaimer, the term of this patent is extended or adjusted under 35 U.S.C. 154(b) by 147 days.

(21) Appl. No.: 13/950,922

(22) Filed: Jul. 25, 2013

(65) Prior Publication Data

US 2014/0116231 A1    May 1, 2014

Related U.S. Application Data

(60) Provisional application No. 61/675,586, filed on Jul. 25, 2012.

(51) Int. Cl.
*G10G 3/04* (2006.01)
*G10H 7/00* (2006.01)
*G10L 17/00* (2013.01)
*G09B 15/02* (2006.01)

(52) U.S. Cl.
CPC .................................. *G09B 15/023* (2013.01)

(58) Field of Classification Search
USPC ......................................................... 84/466
See application file for complete search history.

(56) References Cited

U.S. PATENT DOCUMENTS

| | | | |
|---|---|---|---|
| 5,287,789 A | 2/1994 | Zimmerman | |
| 5,906,494 A | 5/1999 | Ogawa et al. | |
| 5,951,302 A | 9/1999 | Decker, Jr. | |
| 6,417,435 B2 | 7/2002 | Chantzis et al. | |
| 7,062,220 B2 | 6/2006 | Haynes et al. | |
| 7,164,076 B2 | 1/2007 | McHale et al. | |
| 7,271,329 B2 | 9/2007 | Franzblau | |
| 7,705,229 B2 * | 4/2010 | Bancroft et al. | 84/609 |
| 8,138,409 B2 | 3/2012 | Brennan | |
| 2004/0107104 A1 * | 6/2004 | Schaphorst | 704/270 |
| 2004/0194610 A1 | 10/2004 | Davis | |
| 2006/0009979 A1 | 1/2006 | McHale et al. | |
| 2006/0150803 A1 * | 7/2006 | Taub | 84/616 |
| 2008/0156171 A1 | 7/2008 | Guldi | |
| 2009/0056525 A1 * | 3/2009 | Oppenheimber | 84/609 |

FOREIGN PATENT DOCUMENTS

WO    WO2010083563 A1    7/2010

* cited by examiner

*Primary Examiner* — Christopher Uhlir
(74) *Attorney, Agent, or Firm* — Ashley Law Firm P.C.; Stephen S. Ashley, Jr.

(57) ABSTRACT

A vocal and/or instrumental training system can include a sound storage database having a plurality of model sound recordings, such as recordings of various wild game calls, stored therein. A user can select one of the model sound recordings to emulate, and provide audio input, such as the user's vocal performance of a wild game call, in an attempt to emulate the selected model sound recording. The audio input can be received by an audio input device, and recorded by a recording device. Audio characteristics, such as pitch, tone, timbre, cadence, rhythm, beat and/or amplitude, of the recorded audio input can be compared with the corresponding audio characteristics of the selected model sound recording. Results of the comparison can be graphically displayed on a sound graph.

18 Claims, 2 Drawing Sheets

VOCAL / INSTRUMENTAL TRAINING SYSTEM AND METHOD OF SAME

CROSS-REFERENCE TO RELATED APPLICATIONS

This application claims priority to U.S. Provisional Patent Application No. 61/675,586, filed Jul. 25, 2012, which is incorporated herein by reference.

TECHNICAL FIELD AND BACKGROUND OF THE INVENTION

The present invention relates to a system for developing and/or improving a person's vocal or musical abilities, such as in singing, game calling and/or playing musical instruments. One embodiment of the invention is a vocal training system comprised of a software program that can be used in smartphone based applications and/or downloadable software for a PC and/or Mac computer that helps users replicate a desired vocal sound, such as a wild game call.

Wild game hunting has been a popular recreational activity in the United States for generations. Many hunters utilize the tactic of game calling, in which the hunter uses his voice to try to mimic the mating, gathering and/or feeding calls of the desired game in an attempt to attract the game to within firing range of the hunter. However, game calling is not easy, and typically requires a great deal of practice and training to become proficient in accurately reproducing a particular game call.

SUMMARY OF THE INVENTION

Therefore, one object of the present invention is to provide a system for developing a person's ability to accurately replicate a desired sound, such as wild game calls, or other vocal performances. These and other objects of the invention can be achieved in the preferred embodiments of the invention described below.

One embodiment of the invention comprises a system that helps users accurately replicate a desired sound comprising a software program that can be used in smartphone based applications and/or downloadable software for a PC and/or Mac computer. The system gives the user the ability to see their sound on a sound graph in comparison to the desired original sound from the software or application or a recorded sound stored on the PC or Mac. The smartphone or computer shows both sounds on the sound graph to help the user improve his performance showing where the user's performance was accurate and the user's mistakes in the performance. The software and application also gives the user a number grade from 0-100% on how well they replicated the original desired sound. The user also has the ability to listen to both sounds at the same time to determine where mistakes were made. The user can share his grades through social media, and challenge others to beat his score. The user can record sounds he desires to emulate, and save them to a PC, Mac or smartphone application for future tutorial sessions.

According to another embodiment of the invention, a vocal and instrumental training system can include a processor device comprising a central processing unit, and a software program operatively connected to the central processing unit, whereby the central processing unit carries out instructions of the program. A sound storage database stores a plurality of model sound files processable by the processor device, and a recording storage database stores a plurality of recorded performance files processable by the processor device. The program instructs the central processing unit to allow a user to select one of the plurality of model sounds files and one of the plurality of recorded performance files, and instructs the central processing unit to perform an analysis comparing audio characteristics of the selected recorded performance file with the audio characteristics of the selected model sound file.

According to another embodiment of the invention, the processor device comprises a computer.

According to another embodiment of the invention, the processor device can be a personal computer or a smartphone.

According to another embodiment of the invention, the plurality of model sound files can include recordings of wild game calls, recordings of vocal performances and/or recordings of musical performances.

According to another embodiment of the invention, the training system includes means for connecting the processor device to the Internet, and the program allows for sound files to be uploaded via the Internet into the model sounds database.

According to another embodiment of the invention, the program instructs the central processing unit to perform an analysis comparing audio characteristics such as pitch, tone, timbre, cadence, rhythm, beat, and/or amplitude of the selected recorded performance file with the corresponding audio characteristics of the selected model sound file.

According to another embodiment of the invention, the program instructs the processor device to graphically display the analysis comparing the audio characteristics of the selected recorded performance file with the audio characteristics of the selected model sound file on a sound graph.

According to another embodiment of the invention, the training system includes an audio unit operatively connected to the central processing unit, so that the audio unit can transmit sound audible to a user, and input means operatively connected to the processor drive and adapted to receive audio input from the user. Recording means can be operatively connected to the processor drive for recording audio input from the user. The recording means includes a selectable recording option, in which selection of the recording option by the user initiates recording of the audio received by the input means. The recorded audio is stored in the recording storage database as one of the plurality of recorded performance files. Playback means can be operatively connected to the processor device to play a selected recorded performance file and a selected model sound file through the audio unit.

According to another embodiment of the invention, the playback means includes a playback option, in which selection of the playback option initiates simultaneous playing of the selected recorded performance file and a selected model sound file through the audio unit.

According to another embodiment of the invention, the audio unit comprises at least one audio speaker.

According to another embodiment of the invention, the input means comprises a microphone.

According to another embodiment of the invention, a method of vocal or instrumental training comprises providing a sound storage database comprising a plurality of model sound recordings, and providing an input device for receiving audio input from a person. A recording device is provided for recording audio input received by the input device, and one of the model sound recordings is selected to emulate. Audio input is provided into the input device that is intended to emulate the selected model sound recording. The audio input is recorded, and the audio characteristics of the recorded audio input is compared with corresponding audio characteristics of the selected model sound recording.

According to another embodiment of the invention, an alphanumeric score is assigned to the recorded audio input based on the comparison of the audio characteristics of the recorded audio input with the audio characteristics of the selected model sound recording.

According to another embodiment of the invention, the audio characteristics of the recorded audio input in comparison with the corresponding audio characteristics of the selected model sound recording are graphically displayed.

According to another embodiment of the invention, the pitch, tone, timbre, cadence, rhythm, beat, and/or amplitude of the recorded audio input are compared with the corresponding audio characteristics of the selected model sound recording.

According to another embodiment of the invention, an Internet website can be provided on which users can upload audio files into the sound storage database.

According to another embodiment of the invention, users of the Internet website can download model sound recordings from the sound storage database. The users can be charged a monetary fee for downloading the model sound recordings from the sound storage database.

According to another embodiment of the invention, recorded audio inputs are stored in a database that can be accessed by website users. The users can listen to a selected audio input, and enter ratings data on the website regarding the selected audio input. A score can be assigned to the selected audio input based on the ratings of the website users.

According to another embodiment of the invention, the model sound recordings are recordings of wild game calls, recordings of vocal performances and/or recordings of musical performances.

According to another embodiment of the invention, the model sound recordings are recordings of wild game calls, and the audio input comprises a person vocally performing a wild game call in an attempt to emulate a selected model sound recording of a wild game call.

DESCRIPTION OF THE PREFERRED EMBODIMENTS OF THE INVENTION AND BEST MODE

Figure 1:
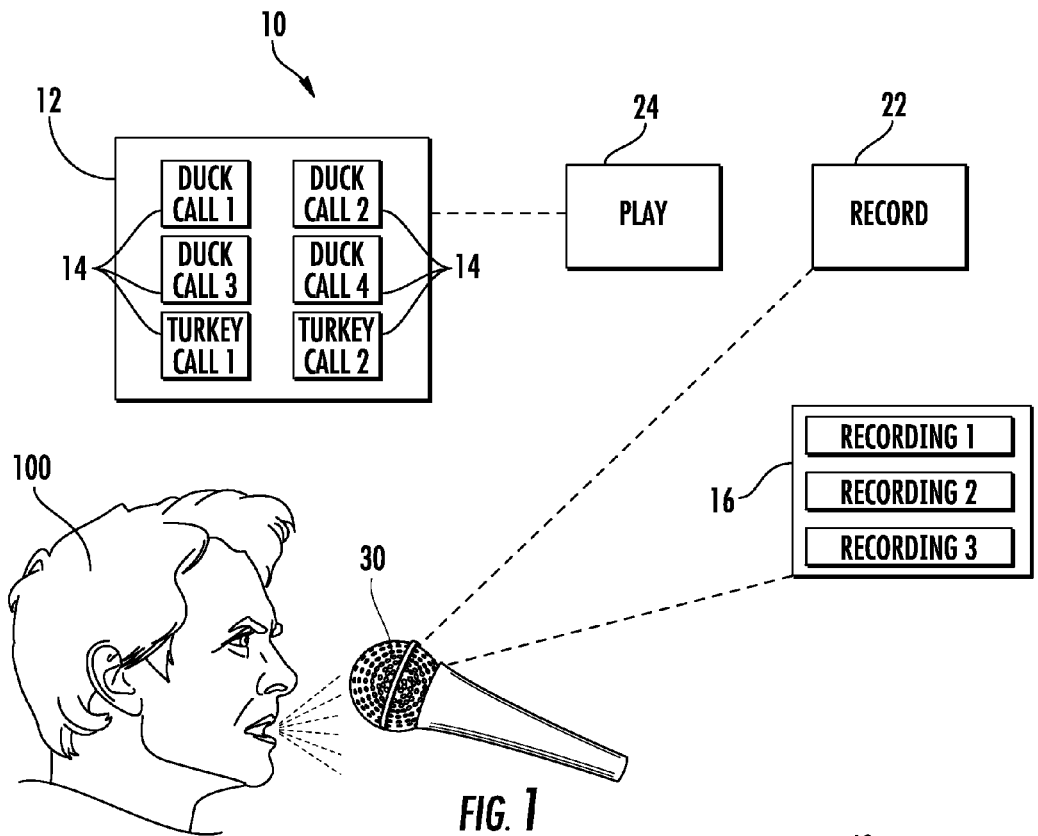
FIG. 1 is a schematic view of a vocal/instrumental training system according to a preferred embodiment of the invention.

A vocal/instrumental training system according to a preferred embodiment of the invention comprises a software program 10 that can be used in smartphone based applications and/or is downloadable software for a PC and/or Mac computer. As shown in FIG. 1, the program 10 includes a sound database 12 on which is stored a plurality of recorded "model" sounds 14 for users to attempt to replicate. The model sounds 14 can be wild game calls, vocal performances, instrumental performances, and/or any other recorded sounds that users wish to emulate.

A user 100 can select a particular model sound 14, such as a particular wild game call, which the user aspires to replicate. The system 10 includes play back and recording means. The playback means can be comprised of a play back option 24, which when selected plays the selected model sound 14.

The system includes input means, such as a microphone 30, for receiving audio input from the user 100, as shown in FIG. 1. After listening to the particular model sound 14 a desired number of times, the user 100 can perform his own version of the model sound 14, which is received into the system 10 via the microphone 30, as shown in FIG. 1, and recorded by the recording means. The recording means can be comprised of a recording option 22, which when selected records the sounds received by the microphone 30 from the user, and stores the recording in a recording database 16. Multiple recordings can be stored in the recording database 16, and retrieved to be played again when desired by the user 100.

Figure 2:
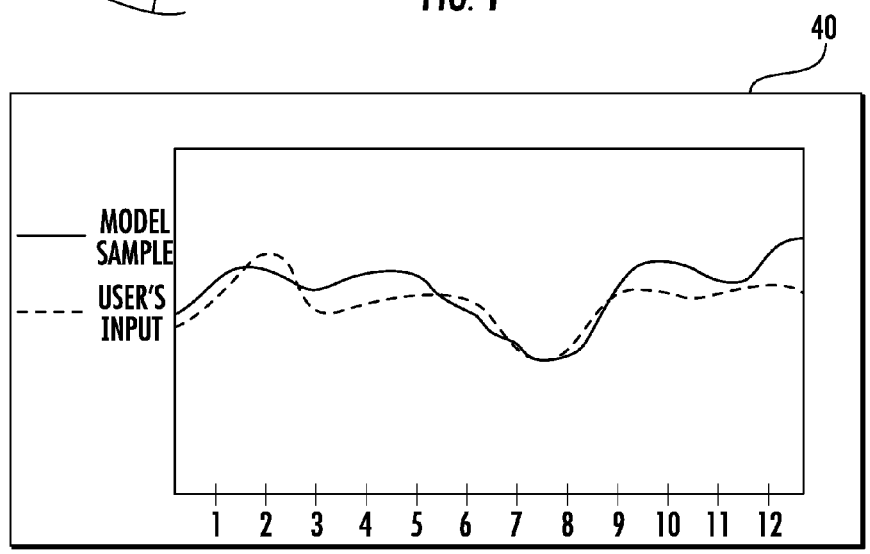
FIG. 2 is a schematic view of a sound graph of the system of FIG. 1.

The system 10 can provide feedback to the user regarding the characteristics of the user's performance, such as the pitch, tone, timbre, cadence, rhythm, beat, and/or amplitude of the performance, and can compare these audio characteristics of the user's performance to those of the selected model sound 14, and visually displays the comparison of the two sounds on a sound graph 40, as shown in FIG. 2. The sound graph can be displayed on the user's smartphone or computer. The sound graph 40 helps the user 100 improve his performance by showing where and how the user's performance accurately replicated the selected model sound, and where and how the user's performance deviated from the model sound. The program can gives the user 100 a number grade from 0-100% relating to how well the user replicated the selected model sound. Also, both the recording of the user's performance and the selected model sound can be played back simultaneously to aid the user 100 in determining where mistakes were made. The user 100 can share his grades through social media, and challenge others to beat his score.

In an embodiment of the invention, the recording means can be voice-activated, and records the user's sound with a pad of 0.5 seconds before and after the end of the sound. A sample frequency of 8000 Hertz is used. Multiple attempts by the user 100 to perform a particular sound or musical piece can be recorded, and the program 10 can use the multiple samples to compute a model, or a weighted average for analysis. The waveform of a sound recording can be converted to a sequence of feature vectors using a frame-based analysis. Features can be computed every forty samples (40/8000=5.0 msec) using 120 samples (15 msec) of audio data to compute the features. The audio data in each analysis window can be converted to a frequency domain representation using a 256 point zero-stuffed fast Fourier transform (FFT) with a rectangular window. Each sound example (ideal set) can be stored as a matrix where each row represents a frame number, and each column represents a feature vector. Ideal examples are first aligned together using an algorithm known as dynamic time warping (a variant of dynamic programming). The initial example is taken as a reference, and the remaining examples are stretched or compressed in time to match the duration of the initial example. The spectrum is then computed frame by frame and the result for each example is saved in a matrix. A user's audio input is compared to the selected model sound recording by correlating the time and frequency representation of the test signal with the ideal examples. The test sound can be aligned with the average of the ideal examples using dynamic programming. The absolute value of the statistical correlation between each feature vector of the test signal and each feature vector of the ideal signal is computed. The mean and median of the rawscore can be computed over all input frames of data. The rawscore calculated above does not extend over the range [0,1]. Rather, it is between [p,q] where p>0 and q<1. So the rawscore is remapped into [0,1] using a mapping function. The procedure used to compute the final rawscore computes two numbers for two extreme cases: (1) using a noise signal instead of test signal; and (2) using several ideal signals instead of test signals. A linear mapping can be defined based on the estimates that maps scores onto the range [0,1].

$$score(1)=\min(\max((mean(rawscore1)-p1)/(q1-p1),0),1)$$

$$score(2)=\min(\max((mean(rawscore2)-p2)/(q2-p2),0),1)$$

The reason for using $\min(\max(\cdot))$ is to make sure the final score is between 0 and 1. Sometimes the raw score computed for the test signal can be worse than the raw score for noise or better than the raw score for ideal case.

$$\text{Postprocess the Score: final\_score}=\text{mean}(score(1),score(2))$$

where score(1) and score(2) are the respective frame-based scores.

The final score is displayed as user feedback.

In a preferred embodiment of the invention, the system 10 can be used by hunters to improve their wild game calling skills. For example, a hunter may wish to improve his duck calling ability. The program 10 includes model samples of various duck call sounds 14 recorded from professional callers. The user 100 selects a particular model sample 14, and listens to the model duck call sound as many times as desired. Then the user 100 can press the record button 22, and record his own performance of the duck call in an attempt to replicate the model sample to which he has been listening. The program 10 gives the user 100 a grade based on how his performance matched the model sample sound 14, and displays to the user on the sound graph 40 where mistakes were made in tone, pitch, beat, cadence, etc. Also, the user can repeatedly listen to the model sample sound 14 and his recorded performance at the same time for comparison.

The system 10 can include a plurality of model sounds 14 that are pre-installed on the software. In addition, the user himself can download model sounds into the system 10, via the user's smartphone or computer. The user can record sounds he desires to emulate, and save them to his computer or smartphone application for future tutorial sessions.

Figure 3:
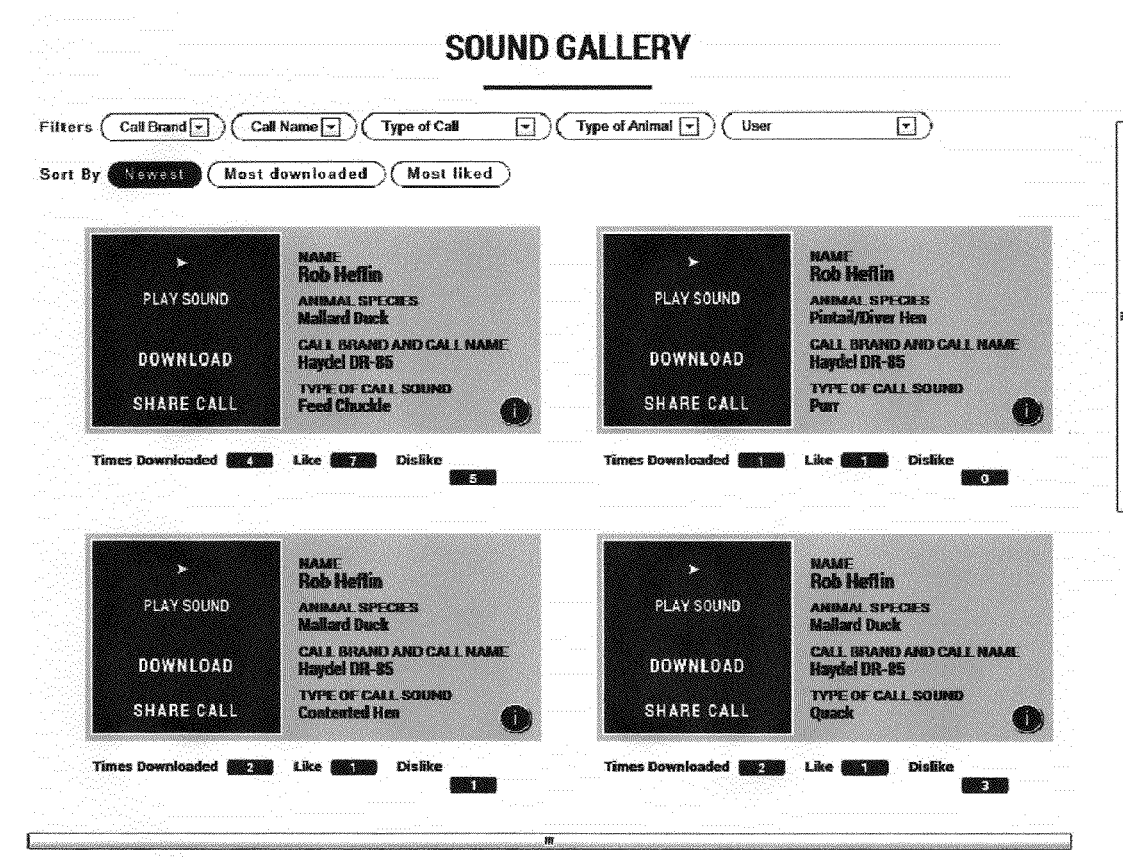
FIG. 3 is a schematic view of a website page according to another embodiment of the invention.

The system 10 can include an Internet website accessible to the general public, on which model sounds can be downloaded using audio files, such as way or MP3, as shown in FIG. 3. In addition, website users can upload their own recordings, which can be downloaded by other users. As such, the system 10 can facilitate a community of multiple users, who can upload model sounds for others to download and use.

The community of users can communicate with each other, and make requests for particular model sound samples. For example, a particular user may be unfamiliar with the call of a particular species of wild game that he intends to hunt. The user can communicate a request on the website for other users who have experience calling the particular species to record and upload model samples of the call for use in training. Users can rate the model sample sounds that have been uploaded to provide guidance to users when determining which uploaded model samples to use for training. In addition, the program 10 can maintain a count of the number of times a particular model sample sound has been downloaded by users, and includes features for sharing to social networking Internet sites, such as FACEBOOK and TWITTER. Also, there can be an "AMERICAN IDOL" style talent contest, in which users vote for various accolades, such as the best model sample sound for a particular species of game call, and the user who has contributed the best overall collection of model sound samples. Top users can win prizes for the sounds they have uploaded.

In another preferred embodiment of the invention, the system 10 comprises a smartphone application or computer program having minimal or no pre-existing sound samples installed thereon. Users are allowed to download this version on their smartphone or computer for free, and are charged a particular fee for downloading the sample sounds of their choice per each sample downloaded. Users can purchase sound samples from a web store having a library of stored samples. Users can upgrade to a fully functional version by paying an upgrade fee.

While a preferred embodiment of the invention is described above as being used to develop wild game calling skills, the invention is not so limited. For example, in another embodiment of the invention, the training system 10 can comprise a software application that aids music teachers in instructing their students to play musical instruments. In this embodiment, a music teacher can download a model sample of instrumental music to be learned by the teacher's student, and the corresponding sheet music for the particular piece of music being taught can be displayed on a pdf file on the student's computer or smartphone. The student can listen to the sample of instrumental music while reading the sheet music. The student can then attempt to replicate the music they have seen and heard, and the system 10 provides a sound graph comparison of the teacher's model sample and the student's recorded performance.

In another embodiment of the invention, a community of musical instrument players sharing the same interest in the same instrument can challenge each other by uploading their own sound samples, and challenge others to try to replicate the quality of the particular sound sample. For example, a guitarist can record himself playing a particular piece of music, upload the recording, and challenge others to replicate his recording. Vocalists can do the same with regard to samples of their singing.

In another embodiment of the invention, users can try to replicate lines from famous movies, television shows and plays. In yet another embodiment of the invention, users can upload various random sound recordings, and other users are allowed to try to replicate them. A user can record a sound, and challenge other users of his choosing to try to replicate the recorded sound and guess what the sound is.

Another embodiment of the invention comprises a smartphone application for use while driving a vehicle. The application compares the vocals emanating from the smartphone generated radio to the vocal performance of the user who is singing along. The user sings the song they are hearing, and the application scores them based on the voice comparisons of the user and the vocals in the original song. Records of best scores for each song that is used in the application are recorded and maintained.

A vocal/instrumental training system and method of same are described above. Various changes can be made to the invention without departing from its scope. The above description of preferred embodiments and best mode of the invention are provided for the purpose of illustration only and not limitation—the invention being defined by the claims and equivalents thereof.

What is claimed is:

1. A wild game call training system comprising:
   (a) a processor device comprising a central processing unit;
   (b) a software program operatively connected to the central processing unit, whereby the central processing unit carries out instructions of the program;

(c) a sound storage database for storing a plurality of model sound files processable by the processor device, the model sound files comprising recordings of wild game calls;
(d) input means operatively connected to the processor device, wherein the input means receives and stores an audio input from a user that is intended to emulate at least one of the plurality of model sound files; and
(e) wherein the program instructs the central processing unit to allow a user to select one of the plurality of model sounds files, and instructs the central processing unit to perform an analysis comparing audio characteristics of the audio input from the user with audio characteristics of the selected model sound file.

2. The system according to claim 1, wherein the processor device comprises a computer.

3. The system according to claim 1, wherein the processor device comprises a device selected from the group consisting of a personal computer and a smartphone.

4. The system according to claim 1, further comprising means for connecting the processor device to the Internet, and further wherein the program allows for sound files to be uploaded via the Internet into the sound storage database.

5. The system according to claim 1, wherein the audio characteristics of the audio input from the user and the audio characteristics of the selected model sound file are selected from the group consisting of pitch, tone, timbre, cadence, rhythm, beat, and amplitude.

6. The system according to claim 1, wherein the program instructs the processor device to graphically display the analysis comparing the audio characteristics of the audio input from the user with the audio characteristics of the selected model sound file on a sound graph.

7. The system according to claim 1, further comprising:
(a) an audio unit operatively connected to the central processing unit, whereby the audio unit can transmit sound audible to the user;
(b) recording means operatively connected to the processor device for recording the audio input from the user, the recording means comprising a selectable recording option, wherein selection of the recording option by the user initiates recording of the audio input received by the input means, and the recorded audio is stored in a recording storage database comprising a plurality of recorded performance files; and
(c) playback means operatively connected to the processor device for playing a selected one of the plurality of recorded performance files and a selected one of the plurality of model sound files through the audio unit.

8. The system according to claim 7, wherein the playback means comprises a playback option, wherein selection of the playback option initiates simultaneous playing of the selected one of the plurality of recorded performance files and a selected one of the plurality of model sound files through the audio unit.

9. The system according to claim 7, wherein the audio unit comprises at least one audio speaker.

10. The system according to claim 7, wherein the input means comprises a microphone.

11. A method of wild game call training comprising:
(a) providing a sound storage database comprising a plurality of model sound recordings, wherein the plurality of model sound recordings comprise recordings of wild game calls;
(b) providing an input device for receiving audio input from a person;
(c) providing a recording device for recording audio input received by the input device;
(d) selecting one of the plurality of model sound recordings to emulate;
(e) providing audio input into the input device that is intended to emulate the selected model sound recording;
(f) recording the audio input; and
(g) comparing audio characteristics of the recorded audio input with corresponding audio characteristics of the selected model sound recording.

12. The method according to claim 11, further comprising the step of assigning an alphanumeric score to the recorded audio input based on the comparing of the audio characteristics of the recorded audio input with the audio characteristics of the selected model sound recording.

13. The method according to claim 11, further comprising the step of graphically displaying the audio characteristics of the recorded audio input in comparison with the corresponding audio characteristics of the selected model sound recording.

14. The method according to claim 11, wherein the step of comparing audio characteristics of the recorded audio input with corresponding audio characteristics of the selected model sound recording comprises comparing audio characteristics selected from the group consisting of pitch, tone, timbre, cadence, rhythm, beat, and amplitude.

15. The method according to claim 11, further comprising providing an Internet website on which users can upload audio files into the sound storage database.

16. The method according to claim 15, wherein users can download model sound recordings from the sound storage database, and further comprising the step of charging users a fee for downloading model sound recordings from the sound storage database.

17. The method according to claim 15, further comprising the step of storing recorded audio inputs and allowing website users to listen to a selected audio input and enter ratings data on the website regarding the selected audio input, and assigning a score to the selected audio input based on the ratings of the website users.

18. The method according to claim 11, wherein the step of providing audio input into the input device comprises a person vocally performing a wild game call in an attempt to emulate the selected model sound recording.

* * * * *